UNITED STATES PATENT OFFICE.

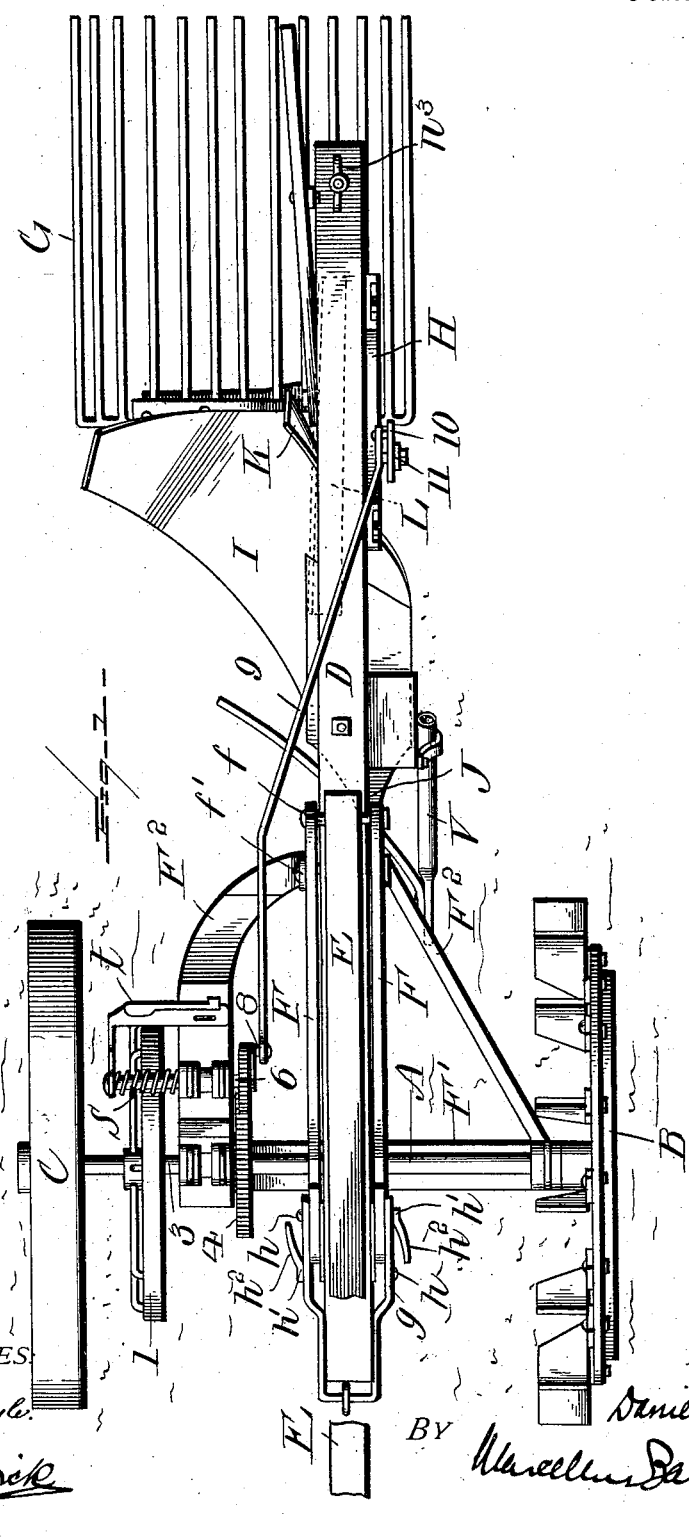

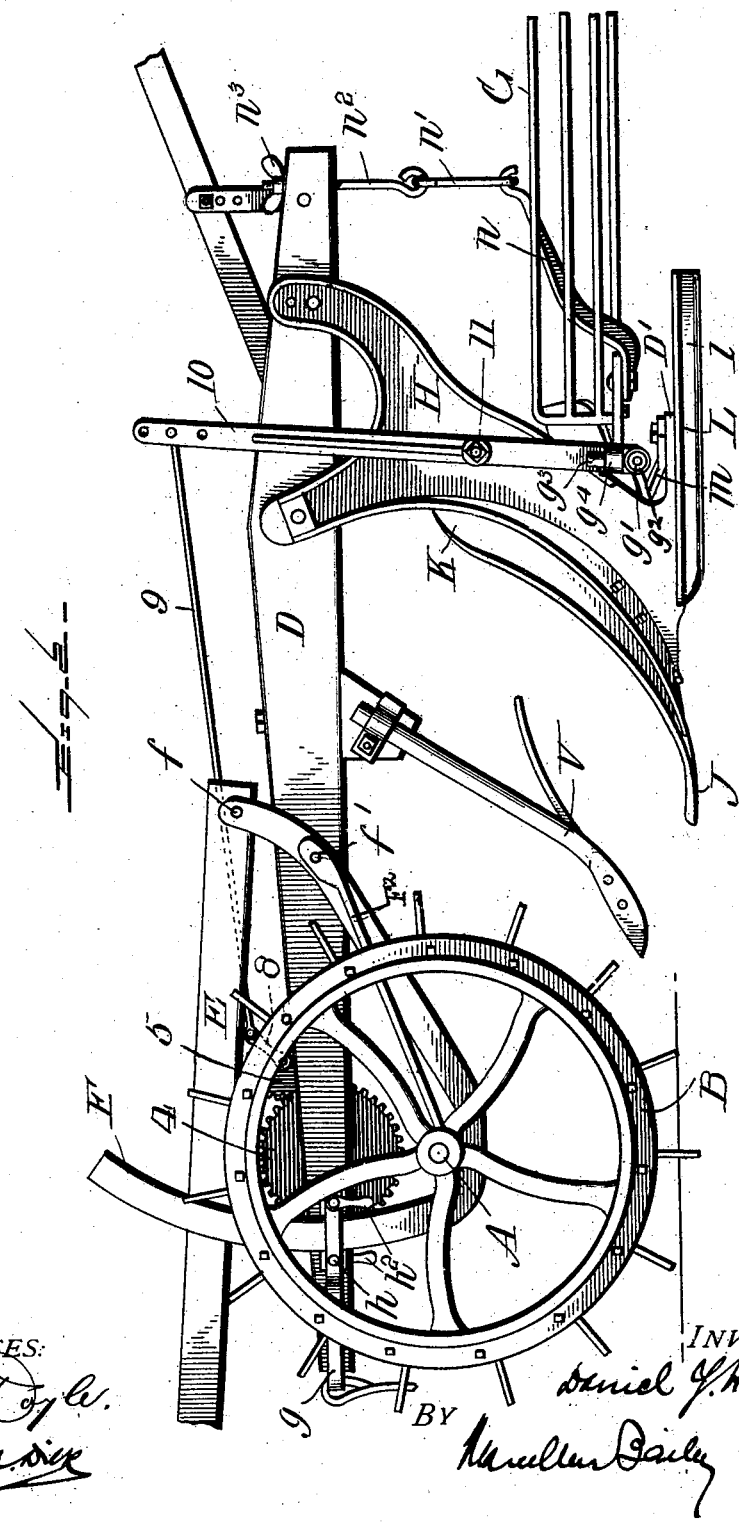

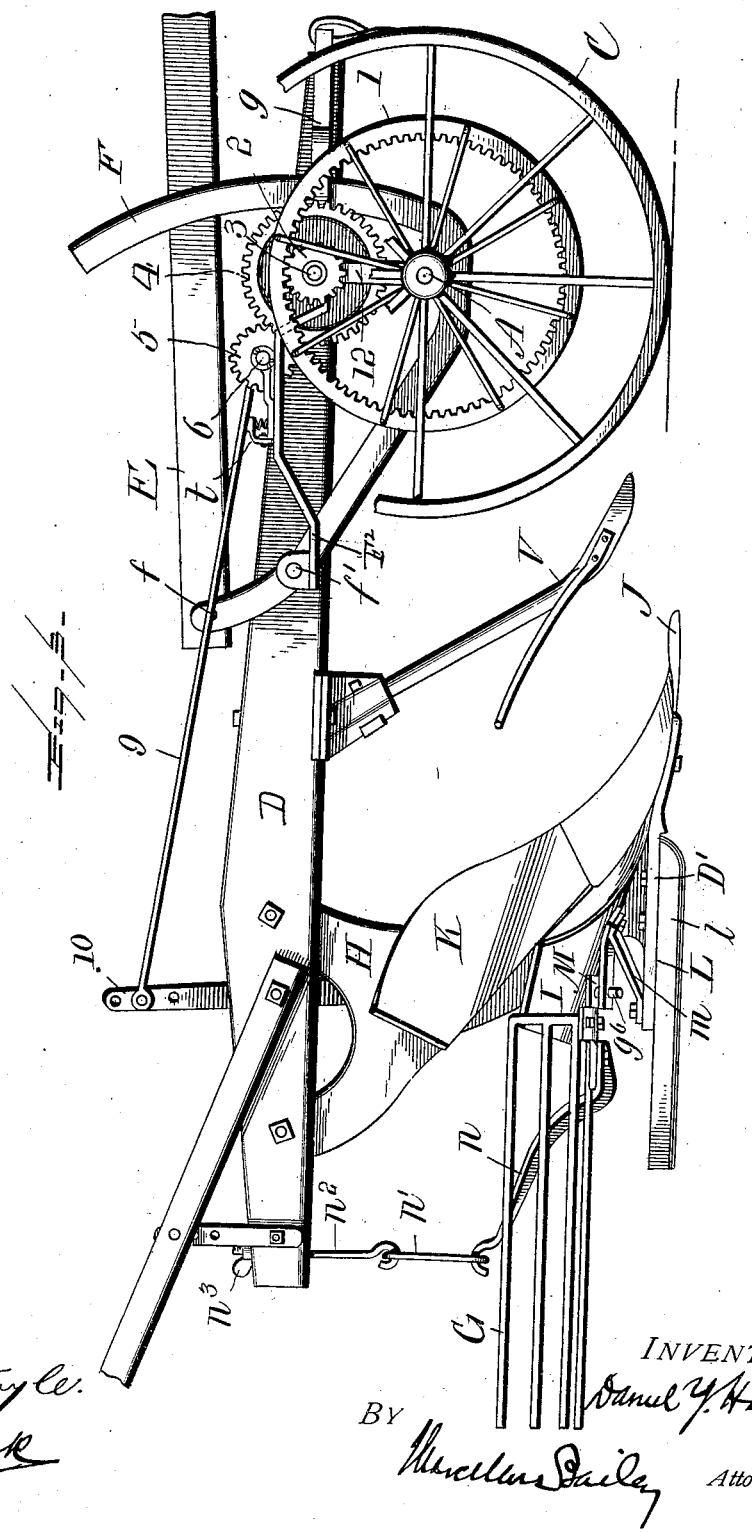

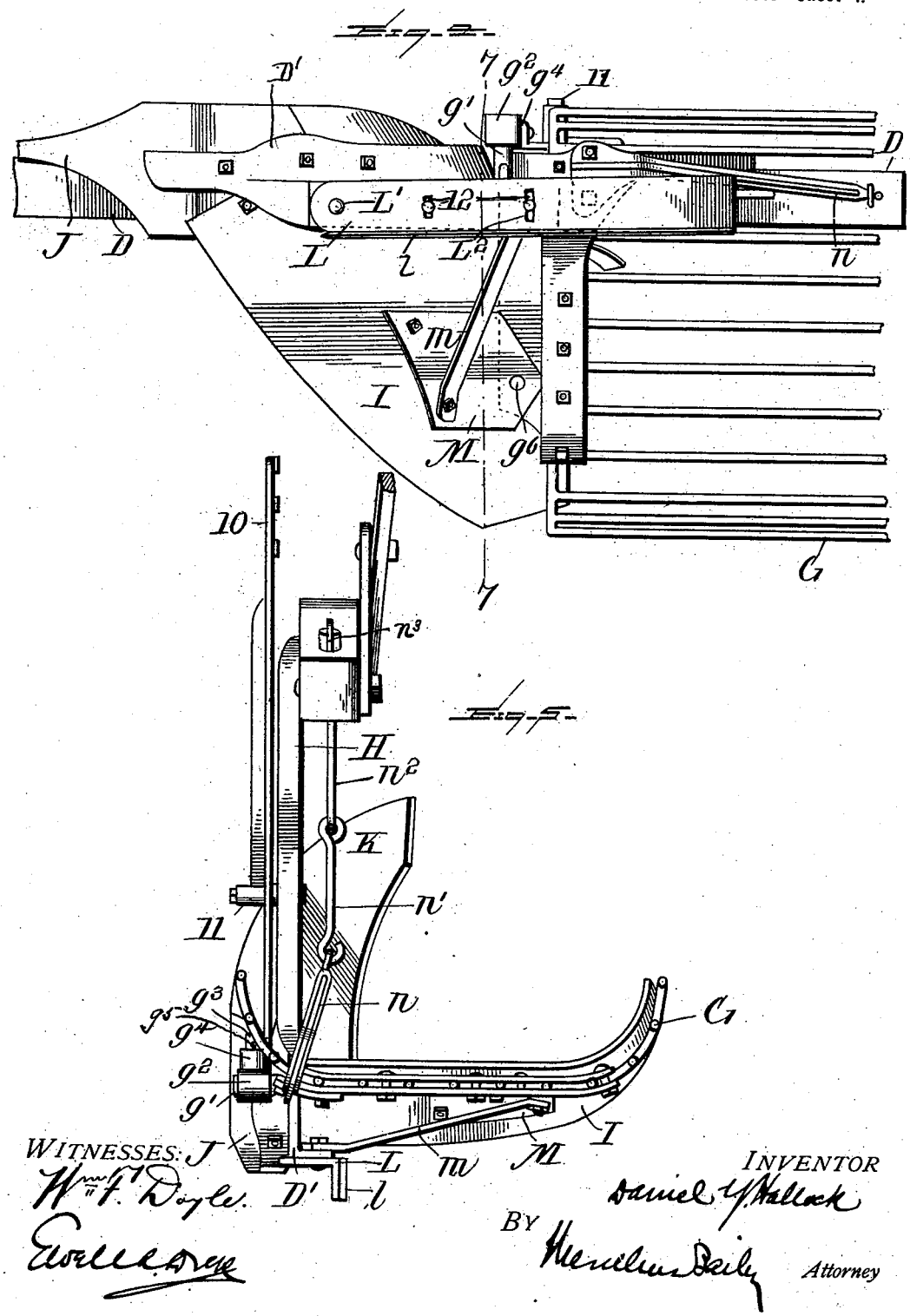

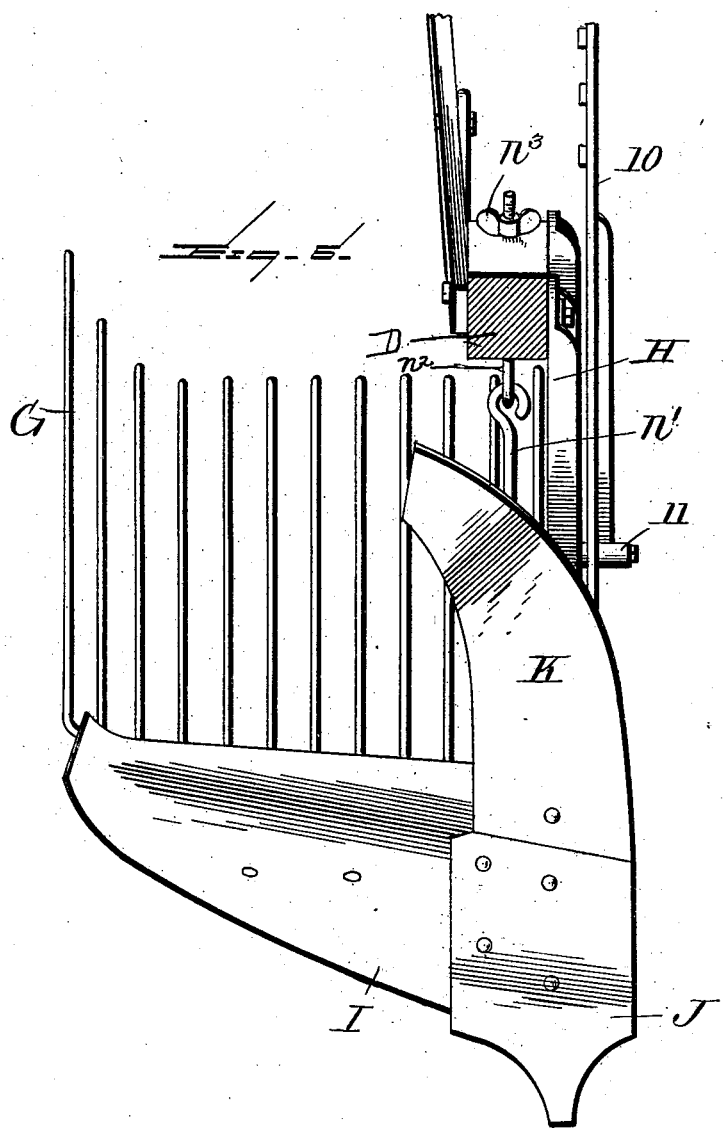

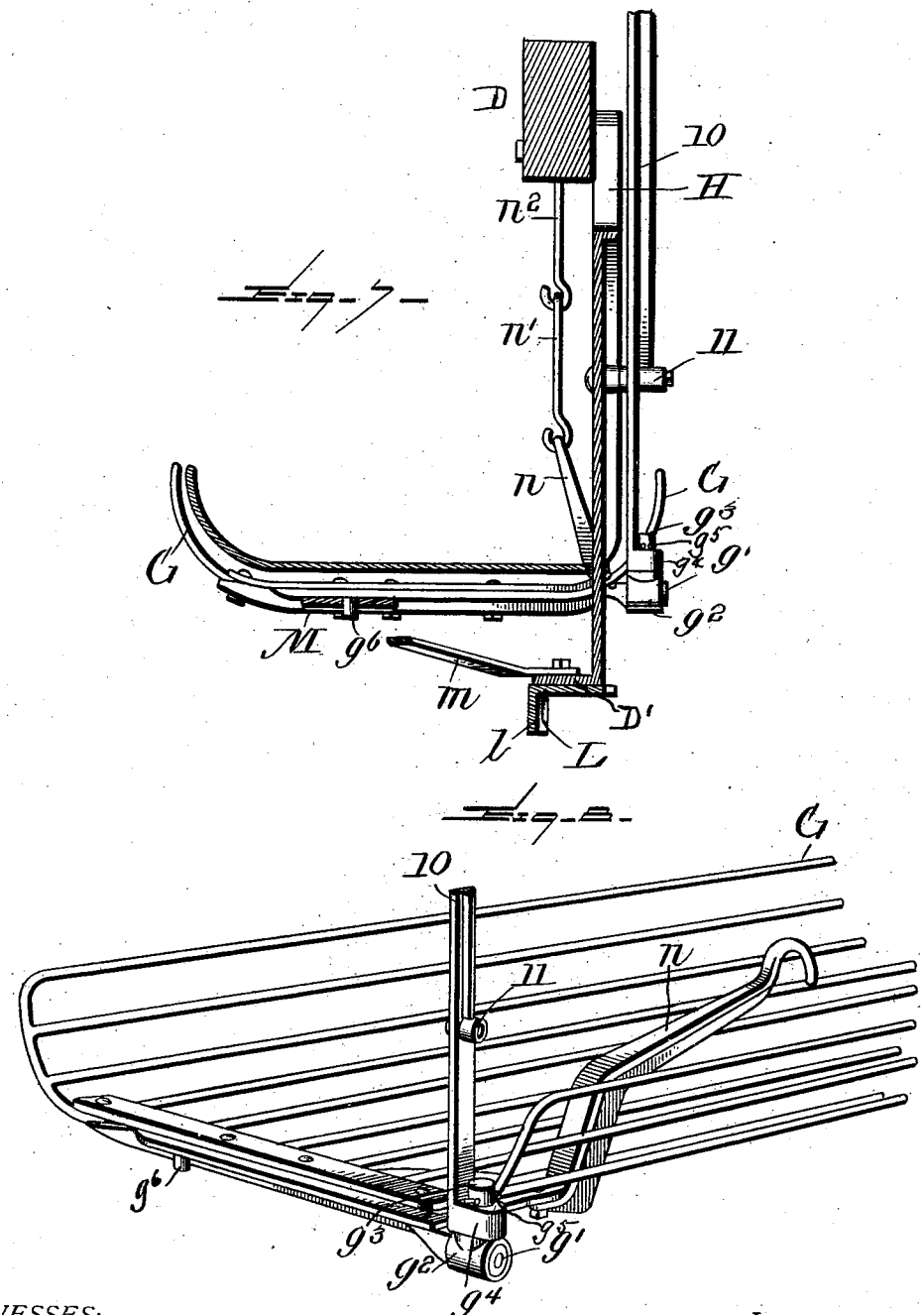

DANIEL Y. HALLOCK, OF YORK, PENNSYLVANIA.

POTATO-DIGGER.

SPECIFICATION forming part of Letters Patent No. 712,927, dated November 4, 1902.

Application filed February 28, 1902. Serial No. 96,173. (No model.)

*To all whom it may concern:*

Be it known that I, DANIEL Y. HALLOCK, a citizen of the United States, and a resident of York, in the county of York and State of Pennsylvania, have invented certain new and useful Improvements in Potato-Diggers, of which the following is a specification.

My invention consists of certain improvements in potato-diggers, having more particular reference to the digging and screening appliances, which will first be described in connection with the accompanying drawings and will then be more particularly pointed out in the claims.

My potato-digger is a one-sided single-shovel machine which acts not to divide the potato-row, but to raise the same bodily and to turn it bottom side up as it passes back onto the screen or agitator in rear of the shovel. This feature is of special value where the tubers are deep in the ground and possesses in this connection a marked advantage over any other method of manipulating the soil. When the row is thus turned bottom side up, deeply-planted tubers are brought near to the surface. In fact, most of them are in sight, and it requires but a little agitation on the screen to bring out the remainder. It is particularly effective where there is grass, for the grass is turned below the tubers, and the tubers do not have to be worked up through the grass.

In the drawings accompanying and forming part of this specification, Figure 1 is a top plan of a potato-digger embodying my improvements in their preferred form. Fig. 2 is a side elevation of the same on the traction-wheel side. Fig. 3 is a side elevation from the opposite side. Fig. 4 is a bottom plan of the shovel, standard, screen, and guide-shoe. Fig. 5 is a rear elevation of these parts, together with the central beam and connections between it and the screen. Fig. 6 is a front view of the shovel, shovel-point, moldboard, standard, and beam, designed to illustrate the location of the standard to one side of the central beam and line of draft and the arrangement of the plow-point and moldboard, so that they shall laterally extend beyond the standard on the side opposite that on which the soil and tubers pass back onto the screen. Fig. 7 is a vertical section looking from the front on line 7 7, Fig. 4. Fig. 8 is a perspective view of the screen detached, so as to better disclose its connections.

A is the axle, and B C are the supporting-wheels, one of which, B, is the traction-wheel and is fast on the axle.

D is the beam held in a supporting-frame consisting, essentially, of two parallel U-shaped vertical irons or straps F hung on the axle, between the rear legs of which the beam is pivoted at $f'$. The front legs of the irons are clamped on the beam by the legs of a yoke or clevis $g$, which are drawn together toward each other from opposite sides of the beam upon the irons F (which come between them and the beam) by bolts $h$, each having a clamping-nut $h'$, provided with a handle $h^2$, by which the nut can be turned, so as to draw the bolt up tight, and thus clamp the irons upon the beam in any position to which the latter may be adjusted.

E is a tongue jointed at $f$ upon a horizontal axis to the irons F. This particular arrangement of the beam and the tongue in a supporting-frame which is mounted and capable of turning on the axle is not here claimed, inasmuch as it has been made the subject of an application in my name for Letters Patent, filed March 18, 1901, Serial No. 51,751. The irons F are in this instance connected to the axle by being made fast to the cross piece or bar F', which is journaled on the axle, said bar carrying the gear-stand 12 and gearing, through which motion is transmitted from the main drive-gear 1 on the axle to the connections for vibrating the screen.

$F^2$ represents diagonal stays or brace-rods for stiffening the beam-supporting frame. They are attached at their front ends, the one to the cross-bar F' and the other to the gear-stand 12, and at their rear ends they are held to the irons F by the same bolt $f''$ which forms the pivot for the beam D.

The main driving-gear 1 is fixed on the axle and is an internal gear. It engages a pinion 2 on an arbor 3, on which is also fixed a larger gear 4, that engages a pinion 5 on an arbor 6, said pinion having a crank or wrist pin 8, which by a pitman 9 is connected with and imparts vibratory motion to a vertical lever 10, pivoted at 11 to the standard H and connected to and adapted to laterally oscillate the screen G, as hereinafter described.

To provide a convenient means whereby the gearing can be thrown out of action when the machine is going to or coming from work, one of the gear-arbors—in this instance the arbor 6—is longitudinally movable in its bearing. A spring $s$ holds the arbor in the position in which its pinion 5 will engage the gear 4, and a hinged-spring latch $t$ is provided, which when the shaft or arbor 6 is pushed in a direction against the stress of spring $s$ far enough to throw its pinion out of mesh with gear 4 will act as a detent to hold the arbor in this position until released by hand.

The standard is shown at H, the single shovel at I, and the shovel-point at J.

K is a skeleton moldboard.

I prefer also to provide the machine with a vine or weed turner V, which is secured to the beam D, as shown, and is designed to operate substantially as set forth in my Patent No. 376,086, of January 10, 1888. The shovel, shovel-point, and moldboard are associated together and secured upon the standard, the moldboard being termed a "skeleton" moldboard because of the opening between it and the shovel which permits the soil and tubers to pass back onto the screen in rear. Their arrangement is such that when in operation they act to raise the row bodily and to turn it over from left to right, passing the dirt and tubers to the right of the standard and back to the screen G in rear and laying off to one side the vines and trash.

It will be noted that in the machine illustrated in the drawings the shovel-point, as well as that portion of the moldboard above which first meets the soil, is situated in a vertical plane to one side of the central beam D and the line of draft. This will be seen more particularly by reference to Figs. 5 and 6, wherein the plow-point and the front portion of the moldboard above are shown as extending in front of and even laterally a little beyond the standard on the side opposite to that on which the dirt and tubers pass, thus forming an effective shield for the standard and turning off to one side the soil before it can reach the standard. This feature, which I believe to be new with me, is material to the successful operation of the machine. When, as has heretofore been the case so far as I am aware, the shovel-point is centrally located with reference to the beam and line of draft and the moldboard is correspondingly placed, the moldboard not infrequently operates in conjunction with the standard to push the row ahead and to clog the machine to such an extent as to spoil the work, and this is the case even when that portion of the standard between the shovel and the beam is laterally deflected to one side of the longitudinal middle of the shovel, as set forth in my Patent No. 682,987, of September 17, 1901; but under the new arrangement and disposition of parts illustrated in the drawings this defect in the operation of the machine is effectually obviated. The standard H itself also is under this arrangement secured to one side of the beam and located in a vertical plane to one side of the central beam D and line of draft, as shown. When the parts are thus located and arranged, there will when the machine is in operation be a tendency to its deflection to the left relatively to the proper line of travel. To counteract this tendency and to render easier the work of guiding the machine, I make use of a trailing guide-shoe—such as shown, for example, at L—located back of the shovel and beneath the screen and attached to a suitable seat D', formed for it on the standard. This shoe is preferably of sheet-steel and of L shape in cross-section, its horizontal limb being attached to the seat D' and its vertical limb $l$ having, preferably, a sharp edge, being set slightly askew or oblique to the central line of the machine, as shown in the drawings, the direction in which it is thus set being opposed to that in which the shovel-point, shovel, and moldboard trend. That is to say, the general slant of the moldboard, shovel, and shovel-point being from left in front to right in rear the slant of the steering or guide shoe will be in a reverse direction—that is to say, from right in front to left in rear. The vertical limb $l$ cuts into and enters the ground as the machine moves forward and its position is such that it tends to push or deflect the machine laterally in a direction opposite to that in which the shovel-point and moldboard tend to deflect it, the result being that the two forces practically neutralize each other.

The guide-shoe L has, in fact, a function akin to that of the landside in an ordinary plow, in that it holds the shovel up to its work. It may not in some cases be necessary to set it askew or on a slant; but its acting edge may be parallel with the line of draft. In other cases, depending upon the nature of the soil and the conditions of the work, it may be necessary to set it even more askew than is shown in the drawings. To this end the guide-shoe is made adjustable on its seat D', being held thereto at the front by a bolt L', on which it can turn as a pivot, and at the rear by bolts which pass through transverse curved slots $l^2$ in the shoe. By loosening the bolts which pass through the slots $l^2$ the shoe can be adjusted to desired positions and can be secured in its adjusted position by tightening up the bolts.

The screen G has at its front a central pivot $g^6$, which sets into a socket in a bolster-plate M, bolted to the under side of the shovel at its front and side edges. A brace-bar $m$, bolted at one end to the seat D' and guide-shoe L and at its other end to the outer portion of the shovel, and the bolster-plate serve to stiffen and strengthen the parts.

For the purpose of laterally oscillating the screen the latter is provided on one side at the front with a laterally-projecting cylindrical hub $g'$, which is encircled by a horizontal sleeve $g^2$, having a vertical solid cylindrical shank $g^3$, upon which is fitted a sleeve $g^4$, laterally projecting from the lower end of the vibratory lever 10, hereinbefore referred to. A cross-pin $g^5$ in the shank $g^3$ and just above the top of the sleeve $g^4$ prevents said parts from drawing away from one another. The sleeve $g^4$ is capable of rotating on the shank $g^3$, and the sleeve $g^2$ can both slide and rotate on the hub $g'$. Under this arrangement the vibratory movement of the vertical lever 10 will produce lateral oscillation of the screen, the nature of the joint between the two permitting this movement to be produced without cramping the parts.

In the upper end of the lever 10 are a number of holes for the pin or bolt which connects the lever and the pitman 9, according to which one of the holes is used for this purpose. The throw of the lever, and consequently the extent of oscillation of the screen, will be correspondingly varied.

It is desirable that the screen should be capable of tilting lengthwise on its pivot $g^6$ for the purpose of elevating or lowering its rear end as conditions may require and that means should be provided for holding it in its adjusted position in this direction. The deeper the planting of the potatoes the higher the rear end of the screen should be, and vice versa. For this purpose the pivot $g^6$ has free enough play in its socket to permit sufficient range of tilting movement to the screen, and back of the pivot is rigidly attached to the screen an arm $n$, which by jointed rods or links $n'$ $n^2$ is suspended from the beam. The upper rod $n^2$ passes loosely up through the beam, and on its upper projecting screw-threaded end is a thumb-nut $n^3$, by adjusting which the rear end of the screen can be drawn up or permitted to drop, as desired.

The nature of the joint between the vibrating vertical lever 10 and the laterally-oscillating screen permits the latter to be tilted more or less, as desired, without interfering with the relation of the parts.

Having described my improvements, I state in conclusion that I do not restrict myself narrowly to the structural details hereinbefore described and illustrated, since manifestly the same can be varied without departure from the spirit of the invention; but

What I claim, and desire to secure by Letters Patent, is as follows:

1. In a potato-digger, the combination of the beam, the standard, a one-sided single shovel, shovel-point and moldboard attached to and carried by the standard, and a screen in rear of the shovel, the plow-point and moldboard above being extended laterally in front of and beyond the standard on the side opposite that on which the soil and tubers of the turned-over row pass back onto the screen, substantially as and for the purposes hereinbefore set forth.

2. In a potato-digger, the combination of the beam, the standard set and secured to one side of the beam, a one-sided single shovel, shovel-point and moldboard secured to the standard and a screen in rear of the shovel, the shovel-point, and moldboard being extended laterally in front of and beyond the standard on the side opposite that on which the soil and tubers of the turned-over row pass back onto the screen, substantially as and for the purposes hereinbefore set forth.

3. In a potato-digger, the combination of the beam, the standard, a one-sided single shovel, shovel-point and moldboard attached to the standard, a screen in rear of the shovel, and a guide-shoe below the screen and back of the shovel, provided with a longitudinal vertical rib which enters the ground and serves to hold the machine while in motion against lateral deflection from the line of draft, substantially as and for the purposes hereinbefore set forth.

4. In a potato-digger, the combination of the beam, the standard, a one-sided single shovel, shovel-point and moldboard attached to the standard, a screen in rear of the shovel, a guide-shoe, below the screen and in rear of the shovel, adjustable so that it may be set at different angles relatively to the line of draft, and means for holding it in its adjusted position, substantially as and for the purposes hereinbefore set forth.

In testimony whereof I have hereunto set my hand this 22d day of February, 1902.

DANIEL Y. HALLOCK.

Witnesses:
 DANIEL E. HALLOCK,
 HOWARD W. HALLOCK.